(No Model.)
Z. W. MURPHY.
MILLSTONE FEEDER AND COOLER.
No. 417,498. Patented Dec. 17, 1889.
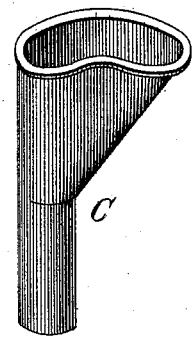
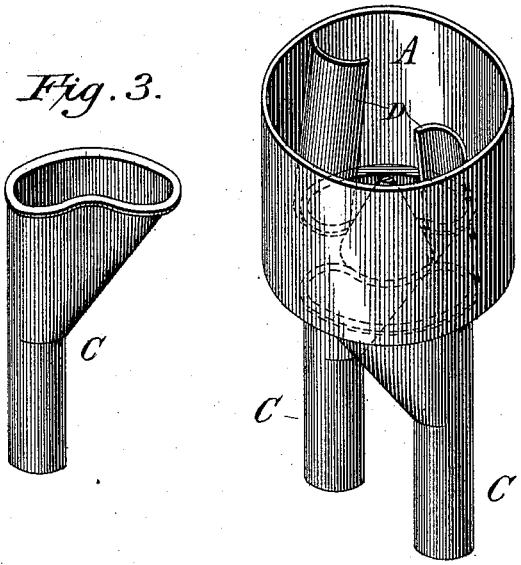
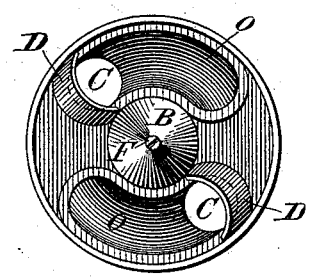
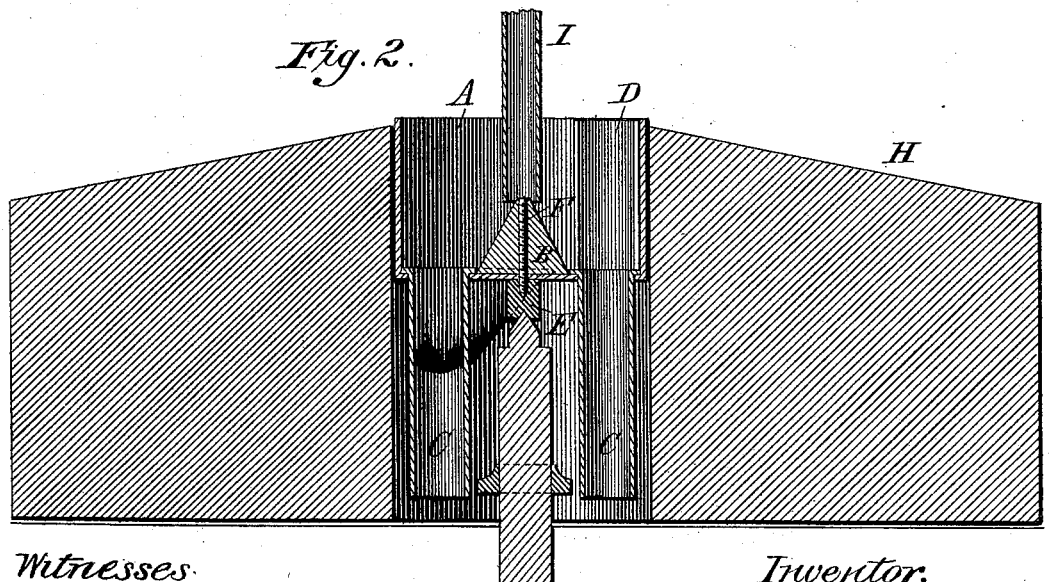
Witnesses
Inventor:
Zachariah W. Murphy

UNITED STATES PATENT OFFICE.

ZACHARIAH W. MURPHY, OF HARRISON, ARKANSAS.

MILLSTONE FEEDER AND COOLER.

SPECIFICATION forming part of Letters Patent No. 417,498, dated December 17, 1889.

Application filed January 17, 1889. Serial No. 296,687. (No model.)

*To all whom it may concern:*

Be it known that I, ZACHARIAH W. MURPHY, a citizen of the United States, residing at Harrison, in the county of Boone and State of Arkansas, have invented a new and useful Millstone Feeder and Cooler, of which the following is a specification.

My invention relates to millstone feeders and coolers, and is adapted only to top-running millstones; and the objects of my invention are, first, to provide a device that will feed all kinds of grain to top-running millstones in an even and continuous flow, and, second, to provide a device that will pass a current of air into top-running millstones sufficient to keep them cool while grinding. I attain these objects by the mechanism illustrated in the accompanying drawings, forming a part of this specification, in which—

Figure 1 is a perspective view of the device. Fig. 2 is a cut sectional view showing the device as attached to a millstone, and Figs. 3 and 4 are detailed views. Fig. 3 clearly shows the peculiar construction of the feed-tubes C C. Fig. 4 is a top view of the device, showing the location of the conical feed-distributer B, the feed-tubes C C, and by dotted lines the concave wings D D.

A, Fig. 1, is a cup of suitable size and depth, which may be made of sheet-iron or tin. In the bottom of cup A are placed the conical feed-distributer B, the feed-tubes C C, and concave wings D D, as shown by dotted lines in Figs. 1 and 4.

B, Figs. 1 and 4, is an iron conical feed-distributer, and is placed in the center of cup A. (See Figs. 1 and 4.)

C C, Figs. 1 and 4, are peculiarly-shaped feed-tubes, (see Figs. 3 and 4,) which, in conjunction with the conical feed-distributer B, cause the grain to pass down through the eye of millstone and deliver it through the nozzles of feed-tubes C C in an even and continuous flow, thereby overcoming all throwing-out motion and preventing all clogging in the eye of the millstone.

D D, Fig. 1, are concave wings which are fastened to the inside of cup A and incline upward (in the direction of rotation of the mill) to the top of cup A, and when the device is attached to the balance-iron of millstone H and is revolved round with the same it will force a strong current of air down through feed-tubes C C between the millstones, and thereby keep them cool while grinding, said feed-tubes C C passing down, one on either side of balance-iron, (see Fig. 2,) to one inch of the face of the millstone from two distributing-spouts for the grain and air.

It will readily be seen that grain being fed from the common straight feed-tube onto the conical feed-distributer B will pass down through feed-tubes C C and mingle with the currents of air forced down them by the action of the concave wings D D.

I am aware that prior to my invention millstone-feeders have been made with straight feed passing down upon a flat feed-distributer fastened to the balance-iron of a millstone, the grain being allowed to fall off all around said distributer and go whirling and clogging down through the eye of the millstone. I therefore do not claim such an invention or combination; but What I do claim, and desire to secure by Letters Patent, is—

In a millstone feeder and cooler, the combination of the cup A, the conical feed-distributer B, the feed-tubes C C, enlarged at their upper ends, and the wings D D above and at back of said tubes, said wings being concaved and inclined toward the direction of rotation of the mill, whereby the grain is fed evenly and currents of air are caused to mingle with the grain, substantially as described.

ZACHARIAH W. MURPHY.

Witnesses:
V. W. MURPHY,
H. J. THORN.